United States Patent [19]

Beugelsdyk et al.

[11] Patent Number: 4,580,455
[45] Date of Patent: Apr. 8, 1986

[54] LOCKING MECHANISM FOR BLADE CLUTCH CONTROL ASSEMBLY

[75] Inventors: Anthony F. Beugelsdyk, Wichita; Terence J. Stuchlik, Emporia; Bruce J. Kester, Wichita, all of Kans.

[73] Assignee: Conchemco, Incorporated, Lenexa, Kans.

[21] Appl. No.: 510,063

[22] Filed: Jul. 1, 1983

Related U.S. Application Data

[63] Continuation-in-part of Ser. No. 338,480, Jan. 1, 1982.

[51] Int. Cl.$^4$ .................... G05G 17/00; A01D 75/20; F16D 23/12
[52] U.S. Cl. .......................... 74/2; 56/11.3; 56/11.8; 74/491; 74/501 R; 180/19.3; 180/272; 192/99 S
[58] Field of Search .......... 74/2, 491, 501 R; 56/11.3, 11.8; 180/19.3, 272; 192/99 S

[56] References Cited

U.S. PATENT DOCUMENTS 4,327,539  5/1982  Bricko et al. .......... 56/10.8 X
4,363,206  12/1982  Schmitt .................. 56/11.3
4,428,180  1/1984  Carlson .................. 56/11.3

Primary Examiner—Allan D. Herrmann
Attorney, Agent, or Firm—Schmidt, Johnson, Hovey & Williams

[57] ABSTRACT

A control apparatus for the blade clutch assembly of a walk-behind powered lawnmower is provided that incorporates a "dead man" feature along with a two-step procedure for engagement of the clutch. The control apparatus includes a shiftable bail, a cable having an engageable end portion, a two-armed coupling mechanism responsive to shifting of the handle, and a pivotally mounted cam for engaging and disengaging the coupling mechanism from the cable end portion. The coupling mechanism is positioned in cable end portion engaging alignment by shifting of the handle to a first position, and is maintained in engagement with the cable end portion by one surface of the cam as the handle and cable are shifted to second positions. The cable is biased by a coil spring to its first position, and upon release of the handle the cable will shift from the second to the first position. A second surface of the cam engages the coupling mechanism for disengagement of the coupling mechanism from the cable end portion when the cable shifts to its first position. Reengagement of the cable end portion by the coupling mechanism can only be accomplished by the two-step procedure described above.

1 Claim, 6 Drawing Figures

LOCKING MECHANISM FOR BLADE CLUTCH CONTROL ASSEMBLY

This application is a continuation-in-part application and discloses and claims subject matter disclosed in our earlier filed pending application Ser. No. 06/338,480, filed Jan. 1, 1982.

BACKGROUND OF THE INVENTION

1. Field of the Invention

The present invention is concerned with an improved control apparatus for use on walk-behind lawnmowers of the type having a clutch interposed between the motor and blade thereof, and having an elongated cable for clutch operation. More particularly, it is concerned with such a control apparatus and method which provides a desirable "dead man" function, along with a twostep procedure for engaging the clutch and initiating blade rotation.

2. Description of the Prior Art

So-called walk-behind rotary powered mowers are well known and in widespread use. Generally speaking, such mowers include a lower-most housing supported on spaced wheels, with a gasoline powered engine coupled to a rotary mower blade disposed within the housing. An elongated handle is affixed to the housing at the rear thereof, so that the user simply pushes the mower in a "walk-behind" fashion.

In recent years the government has promulgated a number of safety regulations relating to mowers of the type described. For example, such mowers must now be equipped with a so-called "dead man" switch which generally includes a spring-biased handle which is grasped by the operator during normal operation of the mower. If the handle is thereafter released, mowing action is rapidly terminated for reasons of safety. Such termination may be by way of stopping the motor, or through a clutch mechanism operatively coupled with the handle which disengages the blade from the motor when the handle is released.

In addition, it has now been proposed that walk-behind mowers be provided with a control apparatus requiring two distinct actions to restart the rotary blade thereof when it has ceased operation.

Accordingly, there is a need within the lawnmower industry to develop a low cost, compact, reliable and easy to use control apparatus for the blade clutch assembly of walk-behind powered lawnmowers.

SUMMARY OF THE INVENTION

The present invention relates to a control apparatus for walk-behind mowers which incorporates a dead man feature and two-step control for engagement of the blade clutch. Broadly speaking, the apparatus hereof includes a shiftable handle, a movable coupling mechanism responsive to shifting of the handle, a shiftable clutch cable having an end portion engageable by the coupling mechanism, and a pivotal ramp having a pair of cam surfaces for urging the coupling mechanism into and out of engagement with the cable end portion.

DESCRIPTION OF THE PREFERRED EMBODIMENT

Figure 1:
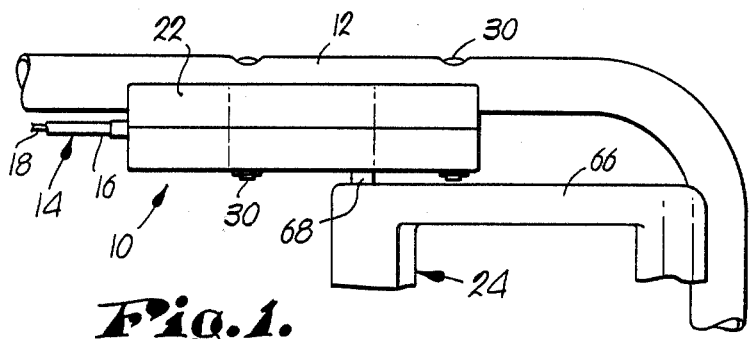
FIG. 1 is a fragmentary perspective view of the control apparatus of the present invention operably mounted on the main handle of walk-behind powered lawnmower.

Turning to the drawing, a control apparatus 10 is depicted as it would appear when operably mounted on the U-shaped main handle 12 of a walk-behind powered lawnmower. The clutch actuating cable 14 extends from apparatus 10 and is operatively connected to a conventional clutch unit coupled between the lawnmower motor and the rotary blade thereof (not shown). Cable 14 is of conventional construction, and includes an outer casing 16 and an internal, longitudinally shiftable, metallic element 18. Biasing spring 20 is connected to the metallic element 18 at a point remote from the apparatus 10. Control apparatus 10 broadly includes a synthetic resin, two-piece housing 22, shiftable handle 24, coupling mechanism 26, and pivotal ramp 28. The housing 20 is coupled to the mower main handle 12 by bolts 30.

Figure 3:
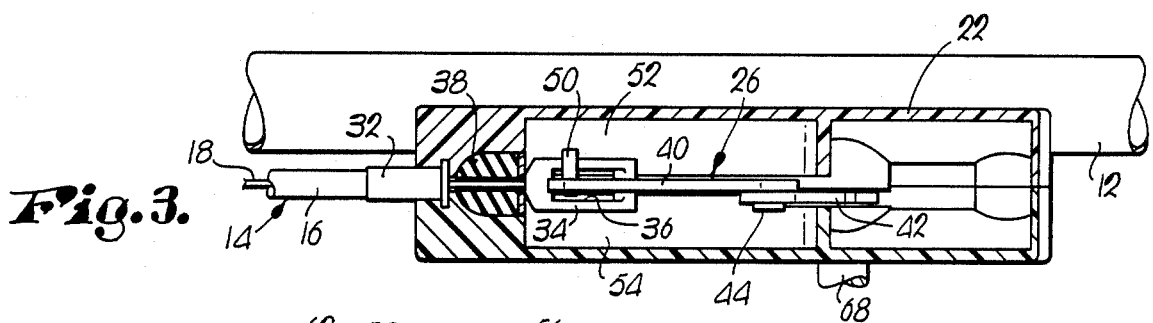
FIG. 3 is a sectional view taken along the line 3—3 of FIG. 2.

Cable sheath 16 is attached to housing 22 by fitting 32. Metallic element 18 of cable 14 terminates within the housing 22 with cable end portion 34. As best seen in FIG. 3, cable end fitting 34 defines an essentially square, coupling mechanism receiving aperture 36. The cable end portion 34 abuts against the resilient cushioning material 38 when biased to the disengaged position.

Figure 6:
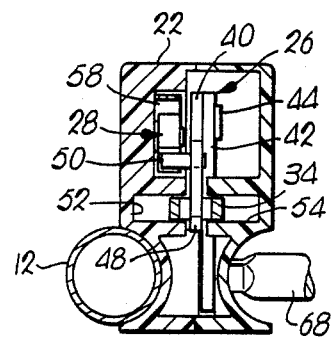
FIG. 6 is a sectional view taken along the line 6—6 of FIG. 2.

Coupling mechanism 26 includes two lever arms 40, 42 connected together at a common axis by a pin 44. Lever arm 42 is pivotally supported by sleeve 46 mounted within the housing 22. Lever arm 40 includes hook portion 48, and cam-following boss 50. As best seen in FIG. 6, cable end portion guiding channels 52, 54 are defined by projections extending inwardly from the side walls of housing 22. A ramp receiving cavity 56 is also defined by projections extending inwardly from one housing side wall. Leaf spring 58 extends within ramp cavity 56 in biasing engagement with ramp 28.

Ramp 28 is pivotally mounted within ramp cavity 56 by pivot pin 60. The ramp 28 includes upper cam surface 62, and lower cam surface 64. It will be seen that each of the cam surfaces 62, 64 are irregularly shaped, and that the biasing action of spring 58 urges the ramp 28 in a clockwise direction from the perspective of FIGS. 2-5. Handle 24 includes a hand graspable bail 66, and a connection rod 68. Rod 68 terminates in a square shaped in cross-section end portion that is received within sleeve 46.

Operation of the control assembly 10 will now be described with reference to FIGS. 2, 4 and 5 which depict an operational sequence.

Figure 2:
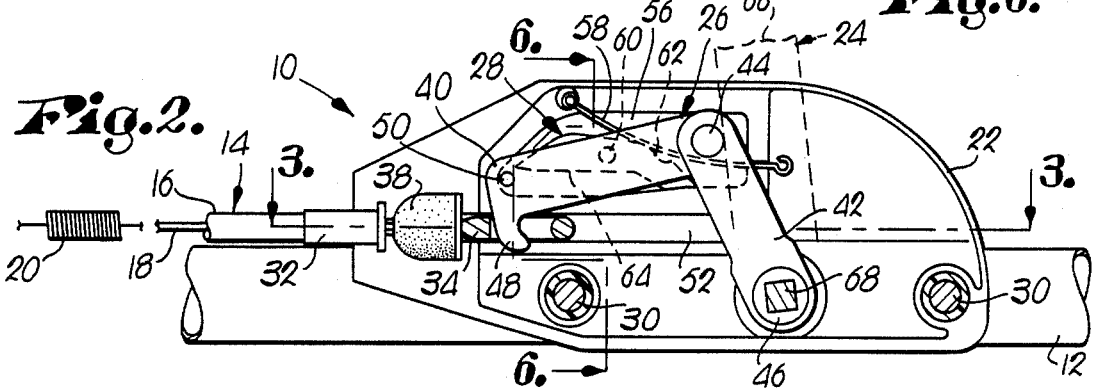
FIG. 2 is a fragmentary, sectional, side view of the control apparatus.
Figure 4:
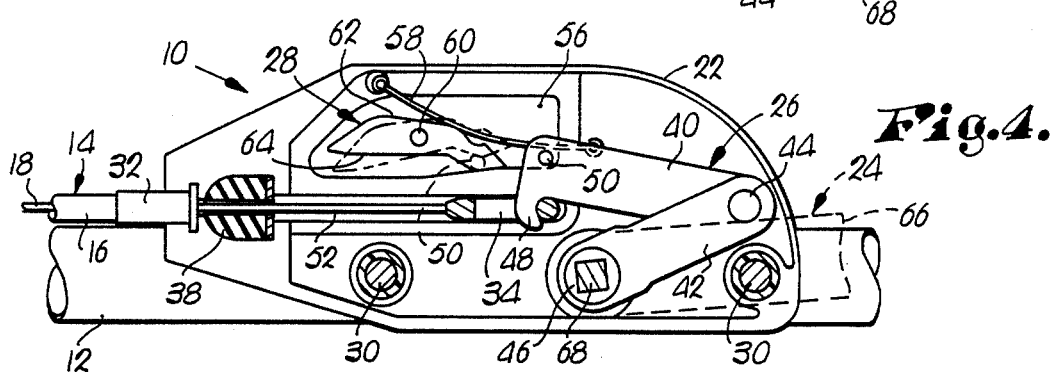
FIG. 4 is similar to FIG. 2 but with the handle, coupling mechanism, and cable in their shifted, clutch-engaged positions.

Shifting of the cable 18 from a first, clutch-disengaged position as depicted in FIG. 2 to a second, clutch-engaged position as depicted in FIG. 4, is initiated by first shifting bail 66 of handle 24 upwardly and forwardly to the position depicted by phantom lines in FIG. 2. Shifting of the bail 66 to its uppermost position will urge the coupling mechanism forwardly. As the mechanism 26 is urged forwardly, boss 50 of lever arm 40 will travel along the upper surface 62 of ramp 28 until the boss 50 reaches the end of ramp 28. The lever arm 40 will drop within ramp cavity 56 once the boss 50 is shifted off the upper cam surface 62 of ramp 28, and the hook 48 of lever arm 40 will be received within the hook receiving aperture 36 of the cable end portion.

Once the hook 48 is received within the hook receiving aperture 36 of cable end portion 34, bail 66 may be rotated downwardly and rightwardly, from the perspective of the figures, to the position depicted by phantom lines in FIG. 4. The boss 50 of lever arm 40 will be engaged by the lower surface 64 of cam 28 as the operating mechanism 26 is shifted rearwardly by the downward action of handle 66. Referring now to the phantom line depiction of ramp 28 in FIG. 4, it will be seen that the ramp rotates in a counterclockwise direction against the biasing force of spring 58 as the boss 50 of lever arm 40 passes underneath the ramp 28. The ramp 28 will snap back to the position depicted in solid lines in FIG. 4 once the boss 50 has cleared the ramp.

The cable end portion 34 is engaged by the hook 48 of the lever arm 40 as the coupling mechanism 26 is urged rearwardly as described above, and the metallic element 18 of cable 14 is accordingly shifted from the clutch-disengaged position to the clutch-engaged position as depicted in FIG. 4. The close engagement of spring 58 with boss 50 when handle 24 is fully retracted will maintain the hook 48 of lever arm 40 in locking engagement with the cable end portion so long as the bail 66 of handle 24 is maintained in grasped position depicted in FIG. 4.

Figure 5:
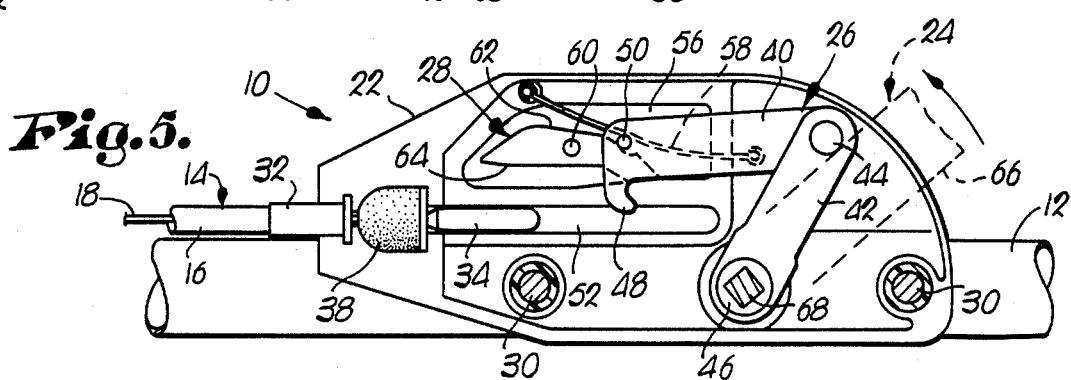
FIG. 5 is similar to FIG. 4 but with the coupling mechanism disengaged from the cable end portion.

The biasing action of spring 20 will shift the metallic element 18 of cable 14, together with the cable end portion 34, leftwardly from the cable engaged position depicted in FIG. 4 to the cable disengaged position depicted in FIG. 5, when the handle 24 is released. As the cable end portion 38 shifts leftwardly, the coupling mechanism 26 will also be shifted. Boss 50 of lever arm 40 will engage the upper cam surface 62 of ramp 28 as the coupling mechanism 26 shifts leftwardly, and the hook 48 of lever arm 40 will be lifted upwardly, as depicted in FIG. 5, as the cable shifts under the biasing influence of spring 20. The bail 66 of handle 24 will fall into contact with the lawnmower control handle 12 under the influence of gravity, once the cable end portion 34 is disconnected from the lever arm 40.

Re-engagement of the cable end portion 34 by the coupling mechanism 26 can be accomplished only by the two-step procedure of first lifting the bail 66 upwardly and forwardly into the position of FIG. 2 so that the hook 48 of lever arm 40 will be received within the hook receiving aperture 36 of cable end portion 34, and then shifting the bail 66 rearwardly and downwardly as described above.

We claim:

1. A control apparatus comprising:

shiftable handle means;

cable means, including an end portion biased to a first position and shiftable to a second position;

coupling means operatively coupled to said handle means and shiftable by said handle means to a position wherein said coupling means engage said cable end portion while said end portion is in said first position for thereafter causing shifting of said end portion from said first position to said second position in response to shifting of said handle means; and means engageable with said coupling means for disengaging said coupling means from said cable end portion when said handle is released and said cable end portion moves from said second toward said first position thereof, said disengaging means comprising a pivotally mounted ramp presenting a disengaging surface, there being means biasing said ramp to a rest position wherein said disengaging surface is oriented so as to disengage said coupling means from said cable end portion, when said cable end portion moves from said second toward said first position, said ramp presenting a second surface for contacting said coupling means and maintaining said coupling means in engagement with said cable end portion during the shifting of said cable end portion from said first to said second position.

* * * * *